US012441051B2

(12) United States Patent
Wright

(10) Patent No.: US 12,441,051 B2
(45) Date of Patent: Oct. 14, 2025

(54) ONE PART, CATALYST CONTAINING, MOISTURE CURABLE DUAL CURE RESINS FOR ADDITIVE MANUFACTURING

(71) Applicant: Carbon, Inc., Redwood City, CA (US)

(72) Inventor: Andrew Gordon Wright, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 18/530,398

(22) Filed: Dec. 6, 2023

(65) Prior Publication Data
US 2024/0131779 A1   Apr. 25, 2024

Related U.S. Application Data

(62) Division of application No. 17/817,673, filed on Aug. 5, 2022, now Pat. No. 11,884,000.

(60) Provisional application No. 63/237,693, filed on Aug. 27, 2021.

(51) Int. Cl.
B33Y 70/00 (2020.01)
B29C 64/106 (2017.01)
B29C 64/35 (2017.01)
B33Y 10/00 (2015.01)
C08G 18/10 (2006.01)
C08G 18/20 (2006.01)
C08G 18/30 (2006.01)
C08G 18/58 (2006.01)
C08G 18/78 (2006.01)
B29K 75/00 (2006.01)

(52) U.S. Cl.
CPC ............ *B29C 64/106* (2017.08); *B29C 64/35* (2017.08); *B33Y 10/00* (2014.12); *B33Y 70/00* (2014.12); *C08G 18/10* (2013.01); *C08G 18/2081* (2013.01); *C08G 18/302* (2013.01); *C08G 18/584* (2013.01); *C08G 18/7843* (2013.01); *B29K 2075/02* (2013.01)

(58) Field of Classification Search
None
See application file for complete search history.

(56) References Cited

U.S. PATENT DOCUMENTS

| | | |
|---|---|---|
| 3,213,058 A | 10/1965 | Boyle et al. |
| 3,694,389 A | 9/1972 | Levy |
| 3,933,692 A | 1/1976 | Kushlefsky et al. |
| 4,338,408 A | 7/1982 | Zimmerman et al. |
| 4,433,170 A | 2/1984 | Zimmerman et al. |
| 5,236,637 A | 8/1993 | Hull |
| 5,391,072 A | 2/1995 | Lawton et al. |
| 5,529,473 A | 6/1996 | Lawton et al. |
| 5,591,791 A | 1/1997 | Deogon |
| 6,057,443 A | 5/2000 | Zimmerman |
| 6,063,206 A | 5/2000 | Latta |
| 6,232,356 B1 | 5/2001 | Mercando et al. |
| 6,458,860 B1 | 10/2002 | Humbert et al. |
| 6,617,413 B1 | 9/2003 | Bruchmann et al. |
| 6,861,475 B2 | 3/2005 | Ilenda et al. |
| 6,894,113 B2 | 5/2005 | Court et al. |
| 6,916,867 B2 | 7/2005 | Gugumus |
| 7,157,586 B2 | 1/2007 | Wood et al. |
| 7,183,248 B2 | 2/2007 | Manning |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,820,760 B2 | 10/2010 | Pham et al. |
| 7,892,474 B2 | 2/2011 | Shkolnik et al. |
| 7,897,558 B1 | 3/2011 | Arafat |
| 8,088,245 B2 | 1/2012 | Lutz et al. |
| 8,110,135 B2 | 2/2012 | El-Siblani |
| 8,765,108 B2 | 7/2014 | Lalleman |

(Continued)

FOREIGN PATENT DOCUMENTS

| | | |
|---|---|---|
| CN | 110128773 A | 8/2019 |
| EP | 1632533 A1 | 3/2006 |

(Continued)

OTHER PUBLICATIONS

International Search Report and Written Opinion corresponding to PCT/US2021/019586; dated Jun. 14, 2021 (12 pages).
Janusziewicz, Rima, et al., "Layerless fabrication with continuous liquid interface production", PNAS, 113(42), 2016, 11703-11708.
Poelma, Justin, et al., "Rethinking digital manufacturing with polymers", Science, 358(6369), 2017, 1384-1385.
Tumbleston, John R., et al., "Continuous liquid interface production of 3D Objects", Science, 347(6228), 2015, 1349-1352.
European Examination Report corresponding to 21713498.0; dated Jan. 11, 2024 (4 pages).
First Office Action corresponding to CN 202180017337.1; dated Dec. 18, 2023 (31 pages, including English translation).

(Continued)

Primary Examiner — Mohammad M Ameen
(74) Attorney, Agent, or Firm — Myers Bigel, P.A.

(57) ABSTRACT

Provided is method of making a three-dimensional object comprising polyurea, which may include: (a) dispensing a one part (1K) dual cure resin into a stereolithography apparatus, the resin comprising or consisting essentially of a photoinitiator, a reactive blocked polyisocyanate, optionally a catalyst such as a polyurethane blowing catalyst, and optionally a polyepoxide; (b) additively manufacturing from said resin an intermediate object comprising the light polymerization product of said reactive blocked polyisocyanate; (c) optionally cleaning said intermediate object; and (d) reacting said polymerization product in said intermediate with water in the presence of a catalyst such as a polyurethane blowing catalyst (which may be included in the resin, the water, or both) to generate polyamine in situ that sequentially reacts with the remainder of the polymerization product to form urea linkages and thereby produce a three-dimensional object comprising polyurea. Dual cure resins useful for the method are also provided.

14 Claims, No Drawings

(56) References Cited

U.S. PATENT DOCUMENTS

| | | | |
|---|---|---|---|
| 9,023,782 B2 | 5/2015 | Peitersen et al. | |
| 9,068,152 B2 | 6/2015 | Klinkhammer et al. | |
| 9,095,787 B2 | 8/2015 | Panandiker et al. | |
| 9,120,997 B2 | 9/2015 | Sadlowski et al. | |
| 9,121,000 B2 | 9/2015 | Burkinshaw et al. | |
| 9,175,248 B2 | 11/2015 | Klinkhammer et al. | |
| 9,198,847 B2 | 12/2015 | Peffly et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,382,397 B2 | 7/2016 | Gaspar et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,782,947 B2 | 10/2017 | Gunzel et al. | |
| 10,259,171 B2 | 4/2019 | Robeson et al. | |
| 10,316,213 B1 | 6/2019 | Arndt et al. | |
| 10,434,706 B2 | 10/2019 | Robeson et al. | |
| 10,882,255 B2 | 1/2021 | Kabaria et al. | |
| 10,932,521 B2 | 3/2021 | Perrault et al. | |
| 2007/0027233 A1 | 2/2007 | Yamaguchi et al. | |
| 2010/0280151 A1 | 11/2010 | Nguyen et al. | |
| 2013/0032375 A1 | 2/2013 | Georlette et al. | |
| 2013/0261199 A1* | 10/2013 | Gaspar | C08G 18/6688 521/115 |
| 2013/0292862 A1 | 11/2013 | Joyce | |
| 2013/0295212 A1 | 11/2013 | Chen et al. | |
| 2015/0184039 A1 | 7/2015 | Lutz et al. | |
| 2015/0240113 A1 | 8/2015 | Pratt et al. | |
| 2015/0331402 A1 | 11/2015 | Lin et al. | |
| 2015/0360419 A1 | 12/2015 | Willis et al. | |
| 2016/0137839 A1 | 5/2016 | Rolland et al. | |
| 2016/0288376 A1 | 10/2016 | Sun et al. | |
| 2017/0129167 A1 | 5/2017 | Castanon | |
| 2017/0129169 A1 | 5/2017 | Batchelder et al. | |
| 2017/0173872 A1 | 6/2017 | Mccall et al. | |
| 2018/0126630 A1 | 5/2018 | Panzer et al. | |
| 2018/0243976 A1 | 8/2018 | Feller | |
| 2018/0290374 A1 | 10/2018 | Willis et al. | |
| 2018/0361660 A1* | 12/2018 | Chen | B29C 64/393 |
| 2019/0160733 A1 | 5/2019 | Mirkin et al. | |
| 2019/0270244 A1 | 9/2019 | Zieringer et al. | |
| 2020/0100554 A1 | 4/2020 | Bologna et al. | |
| 2020/0172669 A1 | 6/2020 | Song et al. | |
| 2020/0174367 A1 | 6/2020 | Chen et al. | |
| 2020/0215415 A1 | 7/2020 | Bologna et al. | |
| 2021/0024155 A1 | 1/2021 | Primeaux et al. | |
| 2023/0095658 A1 | 3/2023 | Wright et al. | |

FOREIGN PATENT DOCUMENTS

| | | |
|---|---|---|
| EP | 2123711 A1 | 11/2009 |
| WO | 2015164234 A1 | 10/2015 |
| WO | 2017210298 A1 | 12/2017 |
| WO | 2020086372 A1 | 4/2020 |
| WO | 2021046376 A1 | 3/2021 |

OTHER PUBLICATIONS

"DXCJ-75 Moisture-curing Isocyanate Prepolymer", Retrieved from https://doxuchem.com/product/dxcj-75-moisture-curing-isocyanate-tdi-based/ on Jan. 22, 2025 (3 pages).

"Herberts 1K-LF 196", Retrieved from https://www.bostik.com/global/en/products/product/advanced-packaging/emea/uk/1k-lf196/ on Jan. 22, 2025 (2 pages).

* cited by examiner

ONE PART, CATALYST CONTAINING, MOISTURE CURABLE DUAL CURE RESINS FOR ADDITIVE MANUFACTURING

CROSS-REFERENCE TO RELATED APPLICATIONS

This application is a divisional of U.S. patent application Ser. No. 17/817,673, filed Aug. 5, 2022, which claims the benefit of Provisional Application No. 63/237,693, filed Aug. 27, 2021, the disclosures of which are incorporated by reference herein.

FIELD OF THE INVENTION

The present invention concerns additive manufacturing resins and methods of using the same.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (2015); U.S. Pat. Nos. 9,211,678; 9,205, 601; and 9,216,546 to DeSimone et al.; see also R. Janusziewicz, et al., *Layerless fabrication with continuous liquid interface production*, PNAS 113, 11703-11708 (2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (2017); see also U.S. Pat. No. 10,316,213 to Arndt et al.

Dual cure resins may be provided as either one part (1K) resins or two part (2K) resins. While 1K resins may be advantageous in eliminating the need to mix two components upon dispensing for use, they can suffer from inadequate shelf stability, even when latent or suspended hardeners are used. Accordingly, there is a need for new approaches to providing 1K dual cure additive manufacturing resins.

SUMMARY OF THE INVENTION

We have surprisingly found that, when products are formed in an additive manufacturing apparatus from a resin comprising a reactive blocked polyisocyanate, polyamine can be generated in situ in the product by contacting it with water, which polyamine can react with the remainder of the polymerization product to form polyurea linkages and thereby produce a three-dimensional object comprising polyurea (including polyurethane-urea blends). This obviates the need to include polyamine (or polyol) chain extender in the resin, itself, and makes available 1K dual cure additive manufacturing resins.

In preferred embodiments, the resin, the water, or both the resin and the water, contains a catalyst that catalyzes the reaction between isocyanate and water, in an amount effective to shorten the time, lower the temperature, or both shorten the time and lower the temperature, at which the three-dimensional object comprising polyurea is produced.

M. Zieringer and A. Kimyonok, US Patent Application Pub. No. 2019/0270244, neither suggests nor describes the in situ production of a polyamine from the polymerization product of a reactive blocked polyisocyanate, but instead relies on latent hardeners, which can become active at elevated temperatures, disadvantageously reducing the storage stability of 1K resins containing the same.

Provided herein according to some embodiments is an additive manufacturing method of making a three-dimensional object comprising polyurea, comprising: (a) dispensing a one part (1K) dual cure resin into a stereolithography apparatus, the resin comprising or consisting essentially of a photoinitiator, a reactive blocked polyisocyanate, optionally (but in some embodiments preferably) a catalyst for the reaction of an isocyanate with water (i.e., a polyurethane blowing catalyst), and optionally a polyepoxide, the reactive blocked polyisocyanate comprising the reaction product of a polyisocyanate and an amine or hydroxyl (meth)acrylate or (meth)acrylamide monomer blocking agent; (b) additively manufacturing from said resin an intermediate object comprising the light polymerization product of said reactive blocked polyisocyanate; (c) optionally cleaning said intermediate object; and (d) reacting said polymerization product in said intermediate with water to generate polyamine in situ that sequentially reacts with the remainder of the polymerization product to form urea linkages and thereby produce a three-dimensional object comprising polyurea.

In some embodiments, the dispensing step (a) is carried out with a resin that further comprises water, the water included in an amount sufficient to convert said polymerization product produced in step (b) to said polyurea produced in step (d).

In some embodiments, the polyepoxide is present in said resin, and said reacting step (d) further comprises reacting said polyepoxide with said polyamine generated in situ to form an epoxy-amine network in said object along with said polyurea. In some embodiments, the polyepoxide comprises a bisphenol A epoxy resin, a bisphenol F epoxy resin, a novolac epoxy resin, an aliphatic epoxy resin, a glycidylamine epoxy resin, an epoxidized vegetable oil, or a combination of two or more thereof.

In some embodiments, the reactive blocked polyisocyanate comprises a polyurethane prepolymer, and said three-dimensional object comprises a copolymer of polyurethane and polyurea.

In some embodiments, the amine or hydroxyl (meth) acrylate or (meth)acrylamide monomer blocking agent comprises a compound of the Formula:

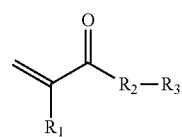

wherein:
R₁ is —CH₃ or —H;
R₂ is —O— or —NH—; and
R₃ is an amine alkyl (e.g, tert-butylarnirkoethyl), amine aryl (e.g. tert-butylaminobenzene), hydroxy alkyl (e.g. 2-hydroxypropane), hydroxy aryl (e.g. 2-hydroxybenzene), hydroxy heteroalkyl (e.g. 2-ethoxy ethanol), amine heteroalkyl (e.g. 2-ethoxy tert-butylaminoethane), amine heteroaryl (e.g. 2-tertbutylaminopyridine), or ketoxime alkyl (e.g. methyl ethyl ketoxime).

In some embodiments, the amine or hydroxy (meth)acrylate or (meth)acrylamide blocking agent comprises tert-butylaminoethyl methacrylate (TBAEMA), tert-btitylantino ethyl acrylate (TBAEA) isopropylamino ethyl methacrylate (iPAEMA), isopropylamino ethyl acrylate (IPAEA), hydroxyphenyl triethaerylate, pyrazole-capped inethacrylate, or ketoxime-functionalized methacrylate.

In some embodiments, the reacting step (d) is carried out by baking said intermediate object in an oven (e.g., an optionally humidified oven).

In some embodiments, the baking step is carried out at an elevated pressure (e.g., in an autoclave, such as a pressurized steam autoclave).

In some embodiments, at least 50%, 60%, 70%, 80%, or 90% of the urea linkages formed in said reacting step (d) are formed from polyamines produced by the reaction of said polymerization product with water.

In some embodiments, the cleaning step (c) is carried out by wiping, washing, centrifugal separation, or a combination of two or more thereof.

In some embodiments, the resin further comprises at least one additional constituent selected from the group consisting of photoabsorbers, pigments, dyes, matting agents, flame-retardants, fillers, non-reactive and light-reactive diluents (e.g., monomeric and polymeric acrylate and methacrylate diluents), and combinations thereof.

In some embodiments, the light-reactive diluent is present and comprises poly(ethylene glycol) dimethacrylate, isobornyl methacrylate, lauryl methacrylate, trimethylolpropane trimethacrylate, acrylate analogs thereof, or any combination thereof.

In some embodiments, the additive manufacturing step is carried up by top-down or bottom-up stereolithography (e.g., continuous liquid interface production, or "CLIP").

In some embodiments, the dispensing step (a) further comprises mixing a first 1K dual cure resin and a second 1K dual cure resin with one another, each resin comprising or consisting essentially of a photoinitiator, a reactive blocked polyisocyanate, a catalyst for the reaction of an isocyanate with water, and optionally a polyepoxide, the reactive blocked polyisocyanate of each said 1K dual cure resin comprising the reaction product of a polyisocyanate and an amine or hydroxyl (meth)acrylate or (meth)acrylamide monomer blocking agent, the first 1K dual cure resin curable into a product having tensile properties different from the second 1K dual cure resin (e.g., rigid versus elastic; rigid versus flexible; flexible versus elastic, high durometer elastic versus low durometer elastic), to produce a combined 1K dual cure resin curable into a product having tensile properties different from those of products produced from either the first or second 1K dual cure resin.

In some embodiments, the three-dimensional object comprises a lattice (e.g., strut and node type lattices, and/or surface lattices, particularly triply periodic surface lattices).

Also provided is a 1K dual cure additive manufacturing resin, comprising or consisting essentially of: (a) a photoinitiator; (b) a reactive blocked polyisocyanate, the reactive blocked polyisocyanate comprising the reaction product of a polyisocyanate and an amine or hydroxyl (meth)acrylate or (meth)acrylamide monomer blocking agent; (c) a catalyst for the reaction of an isocyanate with water (i.e., a polyurethane blowing catalyst); (d) optionally, a polyepoxide; and (e) optionally, water.

In some embodiments, the water is present in the resin.

In some embodiments, the reactive blocked polyisocyanate comprises a polyurethane prepolymer.

In some embodiments, the polyepoxide is present (e.g., and comprises a bisphenol A epoxy resin, a bisphenol F epoxy resin, a novolac epoxy resin, an aliphatic epoxy resin, a glycidylamine epoxy resin, an epoxidized vegetable oil, or a combination thereof).

In some embodiments, the amine or hydroxyl (meth)acrylate or (meth)acrylamide monomer blocking agent comprises a compound of the Formula:

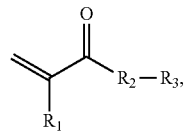

wherein R₁, R₂ and R₃ are as provided above.

In some embodiments, the amine or hydroxyl (meth)acrylate or (meth)acrylamide monomer blocking agent comprises tert-butylaminoethyl methacrylate (TBAEMA), tert-butylamino ethyl acrylate (TBAEA) isopropylamino ethyl methacrylate (IPAEMA), isopropylamino ethyl acrylate (IP-AEA), hydroxyphenyl methacrylate, a pyrazole-capped methacrylate, a ketoxime-functionalized methacrylate, or a combination thereof.

In some embodiments, the resin further comprises or consists essentially of at least one additional constituent selected from the group consisting of photoabsorbers, pigments, dyes, matting agents, flame-retardants, fillers, non-reactive and light-reactive diluents (e.g., monomeric and polymeric acrylate and methacrylate diluents), and combinations thereof.

In some embodiments, the light-reactive diluent is present and comprises poly(ethylene glycol) dimethacrylate, isobornyl methacrylate, lauryl methacrylate, trimethylolpropane trimethacrylate, acrylate analogs thereof, or a combination of any thereof.

The foregoing and other objects and aspects of the present invention are explained in greater detail in the specification set forth below. The disclosures of all United States patent references cited herein are to be incorporated herein by reference.

DETAILED DESCRIPTION OF ILLUSTRATIVE EMBODIMENTS

The present invention is now described more fully hereinafter. This invention may, however, be embodied in many different forms and should not be construed as limited to the embodiments set forth herein; rather, these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

(A) Definitions

"Polyisocyanate" as used herein refers to compounds having two or more reactive isocyanate groups. Polyisocyanates may be monomers or prepolymers. Polyisocyanate prepolymers may be configured for any tensile property desired in the polymerization product thereof, and thus include rigid prepolymers, flexible prepolymers, and elastic prepolymers.

"1K resin" as used herein refers to a premixed resin. A premixed resin is one in which all components are packaged in a single container that is shipped to the end user for dispensing and use. The resin in the single container is "complete" in that it contains all necessary ingredients for (in the case of a dual cure resin) both an initial, light cure, step during additive manufacturing, and a subsequent curing step (e.g., moisture cure, preferably with heating) to produce the finished object. This is in contrast to a "2K resin," which is shipped to the customer in two separate containers, the contents of which are mixed together when dispensed from their containers close to the time of use, due to their more limited pot life (the time required for the viscosity of a complete resin to double after mixing, at a defined temperature). While pot life is more typically applied to 2K resins than to 1K resins, for the purposes of the present invention, 1K resins as used herein are those that have a pot life of at least 1, 2, 3 or 4 months at a temperature of 25 degrees Centigrade.

"Alkyl" as used herein alone or as part of another group, refers to a straight or branched chain hydrocarbon containing from 1 to 10 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl, in some embodiments preferred, and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like.

"Heteroalkyl" refers to an alkyl group that contains one, two or three heteroatoms independently selected from N, O, and S that are substituted for carbon atoms.

"Aryl" as used herein alone or as part of another group, refers to a monocyclic carbocyclic ring system or a bicyclic carbocyclic fused ring system having one or more aromatic rings. Representative examples of aryl include, azulenyl, indanyl, indenyl, naphthyl, phenyl, tetrahydronaphthyl, and the like.

"Heteroaryl" refers to an aryl group that contains from one to four heteroatoms selected from N, O, and S. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl.

"Amine alkyl" as used herein refers to an amine group covalently coupled to an alkyl group as described above, which alkyl group is in turn coupled to the core molecule. "Amine aryl" refers to an amine group covalently coupled to an aryl group as described above, which aryl group is in turn coupled to the core molecule. "Amine heteroalkyl" as used herein refers to an amine group covalently coupled to a heteroalkyl group as described above, which heteroalkyl group is in turn coupled to the core molecule. "Amine heteroaryl" refers to an amine group covalently coupled to a heteroaryl group as described above, which heteroaryl group is in turn coupled to the core molecule.

"Hydroxy alkyl" as used herein refers to a hydroxy group (—OH) covalently coupled to an alkyl group as described above, which alkyl group is in turn coupled to the core molecule. "Hydroxy heteroalkyl" as used herein refers to a hydroxy group (—OH) covalently coupled to a heteroalkyl group as described above, which heteroalkyl group is in turn coupled to the core molecule. "Hydroxy aryl" refers to a hydroxy group covalently coupled to an aryl group as described above, which aryl group is in turn coupled to the core molecule.

"Ketoxime alkyl" as used herein refers to a ketoxime group (RR'=N—OH) covalently coupled to an alkyl group as described above, which alkyl group is in turn coupled to the core molecule.

(B) Additive Manufacturing Methods and Apparatus

Suitable additive manufacturing methods include bottom-up and top-down additive manufacturing, generally known as stereolithography. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546, and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, US Patent Application Pub. No. US 2017/0129167; L. Robeson et al., PCT Patent Pub. No. WO 2015/164234 (see also U.S. Pat. Nos. 10,259,171 and 10,434,706); C. Mirkin et al., PCT Patent Pub. No. WO 2017/210298 (see also US Pat. App. US 2019/0160733); B. Feller, US Pat App. Pub. No. US 2018/0243976; M. Panzer and J. Tumbleston, US Pat App Pub. No. US 2018/0126630; and K. Willis and B. Adzima, US Pat App Pub. No. US 2018/0290374.

(C) 1K Moisture-Curable Resins and Methods

In general, a dual cure polymerizable liquid or resin includes: (i) a light polymerizable liquid first component, and (ii) a second solidifiable component that is different from the first component. See, e.g., U.S. Pat. Nos. 9,676,963, 9,453,142 and 9,598,606 to Rolland et al., the disclosures of which are incorporated herein by reference in their entirety. In some embodiments, the resin includes a blocked or reactive blocked polyisocyanate. In some embodiments, the resin does not include or substantially include chain extender(s), and may be provided as a 1K resin.

In the present invention, the second solidifiable component is solidifiable upon exposure to water (e.g., in liquid, gas, or aerosol form). In some embodiments, water can be included in the resin, and then in situ amine generation initiated, e.g., by heating the intermediate product. When included, the water can be in any suitable amount, solubilized in, dispersed in, or suspended in the resin as desired.

In some embodiments, the reactive blocked polyisocyanate is the reaction product of a polyisocyanate and an amine or hydroxyl (meth)acrylate or (meth)acrylamide monomer blocking agent. In some embodiments, the amine or hydroxyl (meth)acrylate or (meth)acrylamide monomer blocking agent may comprises a compound of the Formula:

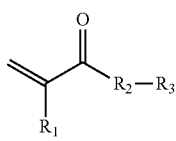

wherein:
  $R_1$ is —$CH_3$ or —H;
  $R_2$ is —O— or —NH—; and
  $R_3$ is an amine alkyl (e.g., tert-butylaminoethyl), amine aryl (e.g. tert-butylaminobenzene), hydroxy alkyl (e.g. 2-hydroxypropane), hydroxy aryl (e.g. 2-hydroxybenzene), hydroxy heteroalkyl (e.g. 2-ethoxy ethanol), amine heteroalkyl (e.g. 2-ethoxy tert-butylaminoethane), amine heteroaryl (e.g. 2-tertbutylaminopyridine), or ketoxime alkyl (e.g. methyl ethyl ketoxime).

In some embodiments, the amine or hydroxy (meth) acrylate or (meth)acrylamide blocking agent comprises tert-butylaminoethyl methacrylate (TBAEMA), tert-butylamino ethyl acrylate (TBAEA) isopropylamino ethyl methacrylate (IPAEMA), isopropylamino ethyl acrylate (IPAEA), hydroxyphenyl methacrylate, pyrazole-capped methacrylate, or ketoxime-functionalized methacrylate.

"ABPU" or "reactive blocked polyurethane" as used herein refers to UV-curable, (meth)acrylate blocked, polyurethane/polyurea (i.e., reactive blocked polyurethane) such as described in U.S. Pat. Nos. 9,453,142 and 9,598,606 to Rolland et al. A particular example of a suitable reactive (or UV-curable) blocking group is a tertiary amine-containing (meth)acrylate (e.g., t-butylaminoethyl methacrylate, TBAEMA, tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) (H12MDI), hexamethylene diisocyanate (HDI), isophorone diisocyanate (IPDI), polymeric MDI, 1,4-phenylene diisocyanate (PPDI), and o-tolidine diisocyanate (TODI). A preferred diisocyanate in some embodiments is H12MDI, such as Desmodur® W, supplied by Covestro AG (Leverkusen, Germany). Additional examples include but are not limited to those given in U.S. Pat. No. 3,694,389 to Levy.

Photoinitiators useful in the present invention include, but are not limited to, diphenyl(2,4,6-trimethylbenzoyl)phosphine oxide (TPO), phenylbis(2,4,6-trimethylbenzoyl)phosphine oxide (PPO), 2-isopropylthioxanthone and/or 4-isopropylthioxanthone (ITX), etc.

Polyepoxides useful in the present invention include, but are not limited to, a bisphenol A epoxy resin, a bisphenol F epoxy resin, a novolac epoxy resin, an aliphatic epoxy resin, a glycidylamine epoxy resin, an epoxidized vegetable oil, or a combination of two or more thereof.

Catalysts. Numerous catalysts for the reaction of an isocyanate with water are known and commercially available. In some preferred embodiments the catalyst is selectively active for the rection of isocyanate with water, as opposed to the reaction of isocyanates with one another. Catalysts known as polyurethane blowing catalysts are suitable for this purpose, and include but are not limited to those set forth in U.S. Pat. Nos. 3,933,692; 4,338,408; 4,433,170; 5,591,791; 6,057,443; 6,232,356; 6,458,860; and 9,382,397, the disclosures of which are incorporated herein by reference. One commercial catalyst suited to this purpose is 2,2'-dimorpholinodiethylether (DMDEE), commercially available from both Huntsman and Evonik (see, e.g., JEFFADD™ additives (Huntsman Corp 2014); JEFFCatODMDEE Catalyst (Huntsman Corp. 2020), TEGOAMIN® DMDEE (Evonik Industries 2007)).

The concentration of the catalyst, when included in the resin, is preferably sufficiently low such that the resin can be used to form the intended intermediate object during additive manufacturing, but sufficiently high to facilitate a faster time, lower temperature, and/or lower humidity cure. For example, the catalyst may, in some embodiments, be included in the resin in an amount between 0.01 or 0.05 percent by weight, to 5 or 10 percent by weight.

Diluents. Diluents as used herein includes both UV-curable diluents (for example monoacrylates, mono-methacrylates, polyacrylates, polymethacrylates, acrylamides, methacrylamides, etc.), and non-UV-curable diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.).

Fillers. Any suitable filler may be used in connection with the present invention, depending on the properties desired in the part or object to be made. Thus, fillers may be solid or liquid, organic or inorganic, and may include reactive and non-reactive rubbers; siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.); inorganic fillers such as silicates (such as talc, clays, silica, mica), glass, carbon nanotubes, graphene, cellulose nanocrystals, etc., including combinations of two or more of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENTH®" SBM (polystyrene-polybutadiene-polymethacrylate), and AMA (polymethacrylate-polybutylacrylate-polymethacrylate), both produced by Arkema (King of Prussia, Pennsylvania). Other suitable block copolymers include FORTEGRA® and the amphiphilic block copolymers described in U.S. Pat. No. 7,820,760B2, assigned to Dow Chemical. Examples of known core-shell particles include the core-shell (dendrimer) particles whose compositions are described in US 2010/0280151 A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533 A1 and EP 2123711 A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPDX® produced by nanoresins AG. This is a master blend of functionalized nanosilica particles and an epoxy.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a glass transition temperature (Tg) of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name GENIOPERL®.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1). Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures of two or more thereof.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Photoabsorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Flame retardants. Flame retardants that may be included in the polymerizable liquids of the present invention may include monomers or prepolymers that include flame retardant group(s). For example, in some embodiments the constituents may be brominated, i.e., contain one, two, three, four or more bromine groups (—Br) covalently coupled thereto (e.g., with total bromine groups in an amount of from 1, 2, or 5% to 15 or 20% by weight of the polymerizable liquid). Flame retardant oligomers, which may be reactive or non-reactive, may also be included in the resins of the present invention. Examples include, but are not limited to, brominated oligomers such as ICL Flame Retardant F-3100, F-3020, F-2400, F-2016, etc. (ICL Industrial Products). See also US 2013/0032375 to Pierre et al. Flame retardant synergists, which when combined with halogens such as bromine synergize flame retardant properties, may also be included. Examples include, but are not limited to, antimony synergists such as antimony oxides (e.g., antimony trioxide, antimony pentaoxide, etc.), aromatic amines such as melamine, etc. See U.S. Pat. No. 9,782,947. In some embodiments, the resin composition may contain synergists in an amount of from 0.1, 0.5 or 1% to 3, 4, or 5% by weight. In some embodiments, an antimony pentoxide functionalized with triethanolamine or ethoxylated amine may be used, which is available as BurnEX® colloidal additives such as BurnEX® A1582, BurnEX® ADP480, and BurnEX® ADP494 (Nyacol® Nano Technologies, Ashland, Massachussetts).

Matting agents. Examples of suitable matting agents include, but are not limited to, barium sulfate, magnesium silicate, silicon dioxide, an alumino silicate, alkali alumino silicate ceramic microspheres, alumino silicate glass microspheres or flakes, polymeric wax additives (such as polyolefin waxes in combination with the salt of an organic anion), etc., including combinations thereof.

Additive manufacturing methods. Methods of making a three-dimensional object comprising polyurea may include: (a) dispensing a 1K dual cure resin into a stereolithography apparatus, the resin comprising or consisting essentially of a photoinitiator, a reactive blocked polyisocyanate, and optionally a polyepoxide, the reactive blocked polyisocyanate comprising the reaction product of a polyisocyanate and an amine or hydroxyl (meth)acrylate or (meth)acrylamide monomer blocking agent; (b) additively manufacturing from said resin an intermediate object comprising the light polymerization product of said reactive blocked polyisocyanate; (c) optionally cleaning said intermediate object; and (d) reacting said polymerization product in said intermediate with water to generate polyamine in situ that sequentially reacts with the remainder of the polymerization product to form urea linkages and thereby produce a three-dimensional object comprising polyurea.

As noted above, in some embodiments, the resin may include water, the water included in an amount sufficient to convert said polymerization product produced in step (b) to said polyurea produced in step (d).

In some embodiments, the polyepoxide is present in said resin, and said reacting step (d) further comprises reacting said polyepoxide with said polyamine generated in situ to form an epoxy-amine network in said object along with said polyurea.

In some embodiments, the resin, the water, or both the resin and the water, contains a catalyst that catalyzes the reaction between isocyanate and water, in an amount effective to shorten the time, lower the temperature, or both shorten the time and lower the temperature, at which the three-dimensional object comprising polyurea is produced. As an example, an effective amount of catalyst may be from 0.05, 0.1, 0.5, or 1 percent by weight, to 2, 3, 4, or 5 percent by weight, of the resin and/or water.

In some embodiments, the 1K resin (which may include catalyst) does not also contain water. The resin is printed, and the printed part is exposed to moisture/humidity for the water cure. In another embodiment, the 1K resin (which may include catalyst) contains water that is pre-blended. The resin is printed, and the further cure is performed (e.g., by baking the printed part) with the water present in the part for the water cure (though exposure of the printed part to moisture/humidity may be performed, as well).

In some embodiments, the resin may be blended with water just prior to printing, instead of or in addition to exposing the printed part to moisture/humidity for the water cure, such as a 2K system with the resin as Part A, and the water as Part B. The catalyst may be included in one or both of Part A and Part B. Possible advantages to including the catalyst in the water in this system may be a longer shelf-stability of the resin, such that high loadings of catalyst could be used, as well as the ability to use a larger portfolio of catalysts, since many could cause side reactions if left in a 1K resin. However, for a catalyst specifically designed for both long shelf stability and high catalyst selectivity with water, such as DMDEE, this may be less of a concern. Although a number of blowing catalysts are either insoluble in water or degrade in water, other catalysts such as DMDEE are both soluble and stable in water. However, the amount of water typically needed to be added if included in the resin is very low, so care should be taken to load it accurately.

If the catalyst is added to water used after printing (such as a water bath soak of the printed part), this may be able to facilitate the cure, as well. However, care should be taken to have a precise balance of soaking time for the catalyst to migrate into the part, considering the part thickness.

In some embodiments, at least 50%, 60%, 70%, 80%, or 90% of the urea linkages formed in the reacting step (d) are formed from polyamines produced by the reaction of the polymerization product with water.

Resin blends. Providing 1K resins can greatly simplify an approach of blending materials at the site of use to provide tunable mechanical properties. For example, two single-pot, moisture-curable precursor resins may be provided, with one of them for products having properties on the stiffer side (e.g. a high durometer elastomer or even a rigid material), while the other is for products that are softer or more elastic (e.g. a low durometer elastomer). A simple two-part mix meter and dispense (MMD) device can be used to adjust the ratio of the two resins to target a specific durometer or other set of properties. This provides great flexibility to the end user and alleviates the need to create new resins whenever new properties are needed.

Thus, in some embodiments of the methods taught herein, dispensing step (a) further comprises mixing a first 1K dual cure resin and a second 1K dual cure resin with one another, each resin comprising or consisting essentially of a photoinitiator, a reactive blocked polyisocyanate, optionally a catalyst that catalyzes the reaction between isocyanate and water, and optionally a polyepoxide, the reactive blocked polyisocyanate of each said 1K dual cure resin comprising the reaction product of a polyisocyanate and an amine or hydroxyl (meth)acrylate or (meth)acrylamide monomer blocking agent, the first 1K dual cure resin curable into a product having tensile properties different from the second 1K dual cure resin (e.g., rigid versus elastic; rigid versus flexible; flexible versus elastic, high durometer elastic versus low durometer elastic), to produce a combined 1K dual cure resin curable into a product having tensile properties different from those of products produced from either the first or second 1K dual cure resin.

Heating. In some embodiments, the intermediate is heated concurrently with and/or subsequent to the reacting with water. For heating or baking steps, the objects may be heated at a temperature of from 20, 30, 40 or 60 degrees Centigrade, to a temperature of 120 or 150 degrees Centigrade, typically for a time of from 1 to 24 hours. Longer curing times may be used when the water reacting is at ambient (room) temperature (e.g., 1 or 2 days to 2 or 4 weeks), optionally but in some embodiments preferably under humidified conditions. Shorter times and/or temperatures may be used when the heating or baking step is carried out under pressure, such as in an autoclave (e.g., a pressurized steam autoclave).

Cleaning/washing. Where necessary or desired, intermediate objects as described above can be cleaned in any suitable manner, such as by wiping (with a rigid or flexible wiper, fabric, or compressed gas such as compressed air), washing, contacting to an absorbent material (e.g., absorbent pads or wipes, granular absorbent materials such as those comprised of diatomaceous earth and/or montmorillonite clay), centrifugal separation, or combinations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p xylene, toluene, benzene, etc., including combinations thereof.

Examples of hydrocarbon (i.e., aliphatic) organic solvents that may be used to carry out the present invention include, but are not limited to, cis decalin, ISOPAR™ G, isooctane, methyl cyclohexane, cyclohexane, heptane, pentane, methylcyclopentane, 2 methylpentane, hexane, petroleum spirit, etc., including combinations thereof.

Examples of ether organic solvents that may be used to carry out the present invention include, but are not limited to, diethylene glycol, ethoxybenzene, triethylene glycol, sulfolane, DEG monobutyl ether, anisole, diphenyl ether, dibutyl ether, t-amyl methyl ether, t butylmethyl ether, cyclopentyl methyl ether, t butyl ethyl ether, 2 methyltetrahydrofuran, diethyl ether, bis(2 methoxyethyl) ether, dimethyl ether, 1,4 dioxane, tetrahydrofuran, 1,2 dimethoxyethane, diisopropyl ether, etc., including combinations thereof. In some embodiments, alcohol-containing ether organic solvents are less preferred.

Examples of dipolar aprotic organic solvents that may be used to carry out the present invention include, but are not limited to, dimethylpropylene urea, dimethyl sulphoxide, formamide, dimethyl formamide, N methylformamide, N methyl pyrrolidone, propanenitrile, dimethyl acetamide, acetonitrile, etc., including combinations thereof.

Examples of halogenated organic solvents that may be used to carry out the present invention include, but are not limited to, 1,2 dichlorobenzene, 1,2,4 trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2 dichloroethane, 2,2,2 trifluoroethanol, etc., including combinations thereof. Examples of base organic solvents that may be used to carry out the present invention include, but are not limited to, N,N dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206.

In some embodiments, the wash liquid can be ethyl lactate, alone or with a co-solvent. One particular example thereof is BIO-SOLV™ solvent replacement (Bio Brands LLC, Cinnaminson, New Jersey, USA), used per se or mixed with water.

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-pentafluoropropane, 1,1,1,3,3-pentafluorobutane, etc.

Examples of hydrochlorofluorocarbon solvents that may be used to carry out the present invention include, but are not limited to, 3,3-dichloro-1,1,1,2,2-pentafluoropropane, 1,3-dichloro-1,1,2,2,3-pentfluoropropane, 1,1-dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec™ 7100 (3M), Novec™ 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

3D Objects with Lattice Structures. Lattice-containing 3D objects that can be produced by the processes described herein include both those including interconnected strut (or "strut and node") lattices, those including surface lattices (such as triply periodic surface lattices), and objects incorporating combinations thereof. Examples of the foregoing include, but are not limited to, lattice-containing saddles, seats, seat cushions, midsoles, helmet liners, body pads, and those other objects incorporating lattices set forth in, Kabaria and Kurtz, Lattice transitioning structures in additively manufactured products, PCT Application WO 2020/086372 (30 Apr. 2020); Kabaria, Kurtz, Sage, Burgess, and Chen, Cushions containing shock absorbing triply periodic lattice and related methods, PCT Application WO 2021/046376 (11 Mar. 2021); Kabaria and Kurtz, U.S. Pat. No. 10,882,255; Perrault et al., U.S. Pat. No. 10,932,521; Primeaux et al., US Pat. App. Pub. No. US 2021/0024155; and Bologna et al., US Pat. App. Pub. Nos. US 2020/0215415 and US 2020/0100554, the disclosures of which are incorporated herein by reference in their entirety.

Three-dimensional lattice objects and/or "self venting" or open structures may be preferred in some embodiments to have uniform water uptake/migration during the moisture cure and allow for faster curing times. Thick parts may require longer humidification times for water to migrate to the center of the part geometries.

Non-limiting examples of the present invention are set forth below.

EXAMPLES

Materials i) 4,4'-diisocyanato-methylenedicyclohexane ($H_{12}$MDI, Desmodur W, Covestro)
ii) Polytetrahydrofuran 2000 MW (PTMEG 2000, BASF)
iii) Polytetrahydrofuran 1000 MW (PTMEG 1000, Sigma Aldrich)

iv) 2-(tert-butylamino)ethyl methacrylate (TBAEMA, Novasol)

v) Di(ethylene glycol) methyl ether methacrylate (DEGMA, CD545, Sartomer)

vi) Poly(ethylene glycol) dimethacrylate 600 MW (PEG600DMA, SR$_{252}$, Sartomer)

vii) Ethyl (2,4,6-trimethylbenzoyl)phenyl phosphinate (TPO-L, PL Industries)

Chemical Reaction Scheme

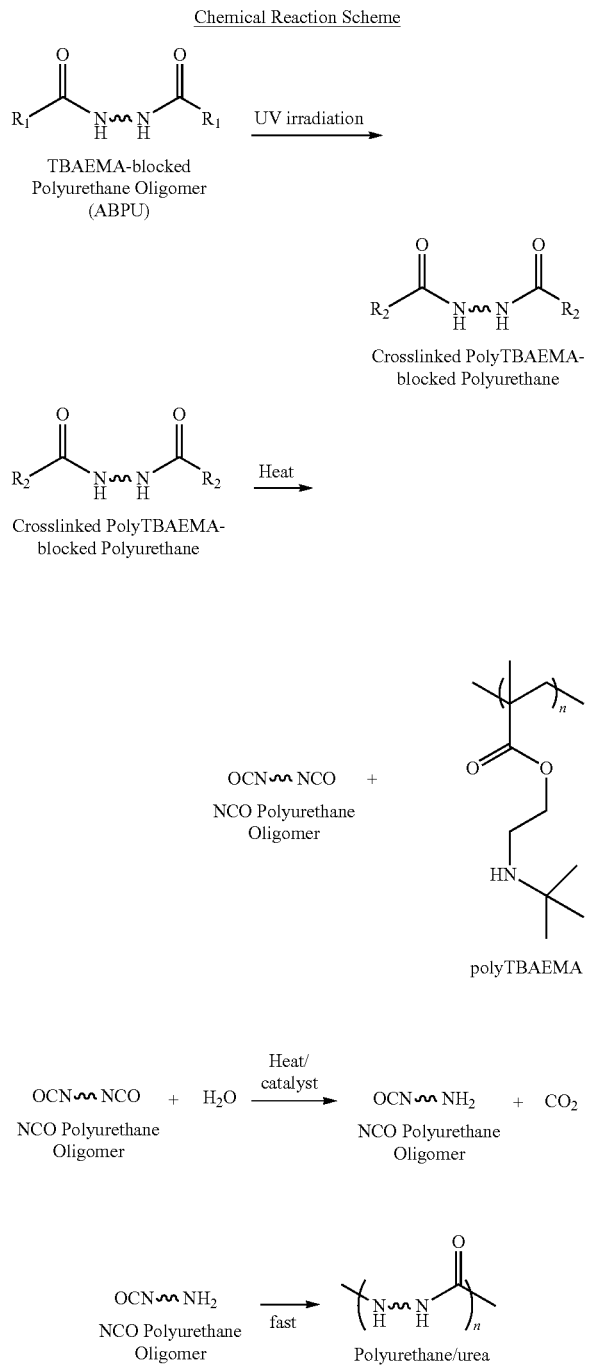

$R_1$ = blocked TBAEMA =

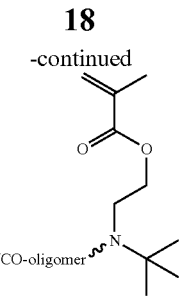

$R_2$ = poly (blocked TBAEMA) =

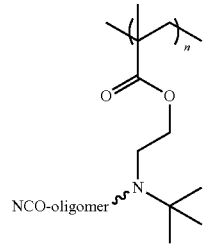

ABPUs 1, 2, and 3 were prepared from NCO-capped oligomers that were reacted with a molar NCO equivalent of TBAEMA, with 2,6-di-tert-butyl-4-methylphenol and 4-methoxyphenol as stabilizers. ABPU 1 (used in Examples 1, 2, 3, and 4) was prepared from Adiprene LFP E560 (Lanxess). ABPU 2 (used in Example 5) was prepared from an NCO-capped oligomer based on H$_{12}$MDI and PTMEG 2000. ABPU 3 (used in Example 6) was prepared from an NCO-capped oligomer based on H$_{12}$MDI and PTMEG 1000.

Example 1

All of the components (Table 1) were added into a container and mixed by planetary centrifugal mixer at 2000 RPM for 4 minutes and 2200 RPM for 1 minute. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part. The sample was removed from the PTFE sheet and was placed in a 100° C. oven for 2 hours in air (ambient humidity of 40%). The sample was then heated to 70° C. in a closed, high humidity container for 19 hours to produce an elastomeric poly(urethane/urea) slab.

Example 2

All of the components (Table 1) were added into a container and mixed by planetary centrifugal mixer at 2000 RPM for 4 minutes and 2200 RPM for 1 minute. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part. The sample was removed from the PTFE sheet and was placed in a 100° C. oven for 2 hours in air (ambient humidity of 40%). The sample was then heated to 70° C. in a closed, high humidity container for 19 hours to produce an elastomeric poly(urethane/urea) slab.

Example 3

All of the components (Table 1) were added into a container and mixed by planetary centrifugal mixer at 2000

RPM for 4 minutes and then by centrifuge at 6000 RPM for 4 minutes. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part. The sample was removed from the PTFE sheet and was placed in a 70° C. oven for 3 hours in air (ambient humidity of 43%). The sample was then heated to 70° C. in a closed, high humidity container for 18 hours to produce an elastomeric poly(urethane/urea) slab.

Example 4

All of the components (Table 1) were added into a container and mixed by planetary centrifugal mixer at 2000 RPM for 4 minutes and then by centrifuge at 6000 RPM for 4 minutes. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part, which was tested as-is (no moisture cure).

Example 5

In a container was added ABPU and DEGMA (Table 1). The container was mixed by planetary centrifugal mixer at 2000 RPM for 4 minutes and at 2200 RPM for 30 seconds. TPO-L was added and mixed at 2000 RPM for 4 minutes and at 2200 RPM for 30 seconds. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part. The sample was removed from the PTFE sheet and was placed in a 90° C., 95% relative humidity chamber for 17 hours to produce an elastomeric poly(urethane/urea) slab.

Example 6

In a container was added ABPU and DEGMA (Table 1). The container was mixed by planetary centrifugal mixer at 2000 RPM for 4 minutes and at 2200 RPM for 30 seconds. TPO-L was added and mixed at 2000 RPM for 4 minutes and at 2200 RPM for 30 seconds. The mixture was poured onto a PTFE sheet, and the thickness was set to approximately 1 mm thickness with a doctor-blade. The mold was UV-cured for 30 seconds in a Dymax ECE UV flood lamp chamber (~100 mW/cm$^2$) to produce a solid sample part. The sample was removed from the PTFE sheet and was placed in a 90° C., 95% relative humidity chamber for 17 hours to produce an elastomeric poly(urethane/urea) slab.

Final Properties Testing

The tensile properties were measured according to AS™ D 412 using Die C specimens at 500 mm/min strain rate. No foaming/bubbling was observed in the approximately 1 mm thickness sample sections prepared here.

TABLE 1

Parts by Weight and Final Properties for Examples 1-6, with Example 4 as the non-moisture cured control sample for Example 3.

| | Example: | | | | | |
|---|---|---|---|---|---|---|
| | 1 | 2 | 3 | 4 (control) | 5 | 6 |
| ABPU # | 1 | 1 | 1 | 1 | 2 | 3 |
| | Parts by Weight | | | | | |
| ABPU | 83.93 | 83.82 | 83.95 | 83.95 | 84.10 | 84.18 |
| PEGDMA | 15.07 | — | 4.99 | 4.99 | — | — |
| DEGMA | — | 15.13 | 10.01 | 10.01 | 14.93 | 14.81 |
| TPO-L | 1.00 | 1.05 | 1.05 | 1.05 | 0.97 | 1.01 |
| | Final Properties | | | | | |
| Young's Modulus (MPa) | 4.5 | 29 | 19 | 32 | 9 | 19 |
| Elongation at Break (%) | 140 | 673 | 287 | 94 | 411 | 253 |
| Ultimate Tensile Strength (MPa) | 33 | 21 | 23 | 10 | 9 | 13 |

Example 7

Inclusion of Catalysts to Accelerate Moisture Cure

The examples above demonstrate moisture curing behavior when the printed parts were placed in humidity chambers at elevated temperatures. The baking times were typically greater than 16 hours and required higher temperatures for aliphatic-based isocyanate ABPUs compared to aromatic ABPUs. While it may have been catalyzed by the presence of residual TBAEMA/polyTBAEMA acting as a catalyst (which may not be a very efficient catalyst, though it is present at high loading), these baking schedules are long and require specialized equipment able to maintain both high humidity and high temperature (and handle volatiles off-gassing from the parts).

To accelerate the moisture cure reaction, incorporating catalysts that are designed to accelerate isocyanate+moisture reactions into the resin systems will facilitate lower temperature and/or shorter time baking schedules. Numerous catalysts specifically designed for 1K moisture curing of unblocked isocyanates are known and commercially available. For example, many tertiary amines (e.g., triethylene diamine (DABCO)) and metals (e.g., dibutyltin dilaurate) can accelerate this reaction.

In some embodiments, preferred catalysts selectively catalyze water plus isocyanate reactions and not other types of reactions (such as isocyanate plus isocyanate reactions, which may compromise the shelf-stability of a 1K resin). One commercial catalyst suited to this purpose is 2,2'-dimorpholinodiethylether (DMDEE). Inclusion of this catalyst with moisture cure resins enables lower time and/or temperature curing, and/or the ability to cure aliphatic based ABPUs at lower temperatures and/or shorter times (potentially to the point that ambient air could be used to complete the cure without specialized oven setups). The concentration of DMDEE can, in preferred embodiments, be between 0.05 percent by weight, to 5 percent by weight, and optimized around balancing the reaction rate to be sufficiently low such that the resin can be handled/processed during printing, but sufficiently high to facilitate a faster time lower temperature, and/or lower humidity cure.

During the moisture cure reaction, $CO_2$ is released, as noted in the scheme above. There was obvious foaming in unblocked systems from the $CO_2$ generation that have low UV crosslinker amounts. During the heat+moisture cure step, these systems become very low green strength materials, almost to the point of being a liquid, allowing $CO_2$ bubble formation to result in permanent foam structures. However, with blocked systems (e.g., ABPUs), this does not appear to cause any obvious foaming in the bulk of the parts. Due to the UV-curable endgroups of the isocyanate prepolymer (ABPU), it is UV-cured to form a fully crosslinked system prior to moisture cure and allows the system to maintain its network structure during the isocyanate+water reaction, where $CO_2$ should degas from the system but not enough (or not rapid enough) to cause bubble formation of an already formed part. The modulus of the system appears to be high enough to prevent or minimize $CO_2$ foam formation from the moisture cure, which is thought to be breaking down the UV network while simultaneously growing the PU network.

The foregoing is illustrative of the present invention, and is not to be construed as limiting thereof. The invention is defined by the following claims, with equivalents of the claims to be included therein.

What is claimed is:

1. A one part (1K) dual cure additive manufacturing resin, comprising:
   (a) a photoinitiator;
   (b) a reactive blocked polyisocyanate, the reactive blocked polyisocyanate comprising the reaction product of a polyisocyanate and an amine or hydroxyl (meth)acrylate or (meth)acrylamide monomer blocking agent;
   (c) a catalyst for the reaction of an isocyanate with water;
   (d) optionally, a polyepoxide; and
   (e) optionally, water.

2. The 1K resin of claim 1, wherein said catalyst is 2,2'-dimorpholinodiethylether (DMDEE).

3. The 1K resin of claim 1, wherein said reactive blocked polyisocyanate comprises a polyurethane prepolymer.

4. The 1K resin of claim 2, wherein said reactive blocked polyisocyanate comprises a polyurethane prepolymer.

5. The 1K resin of claim 1, wherein said amine or hydroxyl (meth)acrylate or (meth)acrylamide monomer blocking agent comprises a compound of the Formula:

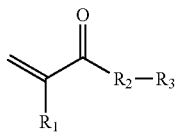

wherein:
$R_1$ is —$CH_3$ or —H;
$R_2$ is —O— or —NH—; and
$R_3$ is an amine alkyl, amine aryl, hydroxy alkyl, hydroxy aryl, hydroxy heteroalkyl, amine heteroalkyl, amine heteroaryl, or ketoxime alkyl.

6. The 1K resin of claim 1, wherein said amine or hydroxyl (meth)acrylate or (meth)acrylamide monomer blocking agent comprises tert-butylaminoethyl methacrylate (TBAEMA), tert-butylamino ethyl acrylate (TBAEA) isopropylamino ethyl methacrylate (IPAEMA), isopropylamino ethyl acrylate (IPAEA), hydroxyphenyl methacrylate, a pyrazole-capped methacrylate, a ketoxime-functionalized methacrylate, or a combination thereof.

7. The 1K resin of claim 1, wherein said resin further comprises at least one additional constituent selected from the group consisting of photoabsorbers, pigments, dyes, matting agents, flame-retardants, fillers, non-reactive and light-reactive diluents, and combinations thereof.

8. The 1K resin of claim 7, wherein said light-reactive diluent is present.

9. The 1K resin of claim 7, wherein said light-reactive diluent is present and comprises poly(ethylene glycol) dimethacrylate, isobornyl methacrylate, lauryl methacrylate, trimethylolpropane trimethacrylate, an acrylate analog thereof, or a combination of any thereof.

10. The 1K resin of claim 1, wherein said polyepoxide is present.

11. The 1K resin of claim 1, wherein said polyepoxide is present and comprises a bisphenol A epoxy resin, a bisphenol F epoxy resin, a novolac epoxy resin, an aliphatic epoxy resin, a glycidylamine epoxy resin, an epoxidized vegetable oil, or a combination of two or more thereof.

12. The 1K resin of claim 1, wherein said water is present.

13. The 1K resin of claim 1, wherein said resin consists essentially of said photoinitiator, said reactive blocked polyisocyanate, said catalyst, optionally the polyepoxide, optionally the water, and optionally at least one additional constituent selected from the group consisting of photoabsorbers, pigments, dyes, matting agents, flame-retardants, fillers, non-reactive and light-reactive diluents, and combinations thereof.

14. The 1K resin of claim 2, wherein said DMDEE is present in an amount of from 0.05 percent by weight to 5 percent by weight of the 1K resin.

* * * * *

UNITED STATES PATENT AND TRADEMARK OFFICE
CERTIFICATE OF CORRECTION

PATENT NO. : 12,441,051 B2
APPLICATION NO. : 18/530398
DATED : October 14, 2025
INVENTOR(S) : Andrew Gordon Wright It is certified that error appears in the above-identified patent and that said Letters Patent is hereby corrected as shown below:

In the Specification

Column 3, Line 16: Please correct "(iPAEMA)" to read --(IPAEMA)--

Column 8, Lines 61-62: Please correct "JEFFCatODMDEE" to read --JEFFCat®DMDEE--

Column 10, Line 8: Please correct "NANOPDX®" to read --NANOPOX®--

Column 15, Lines 34-35: Please insert a paragraph break between "thereof." and "Examples"

Column 17, Line 7: Please correct "$SR_{252}$" to read --SR252--

Column 19, Line 64: Please correct "$AS^{TM}$" to read --ASTM--

Signed and Sealed this
Twenty-seventh Day of January, 2026

John A. Squires
*Director of the United States Patent and Trademark Office*